United States Patent [19]

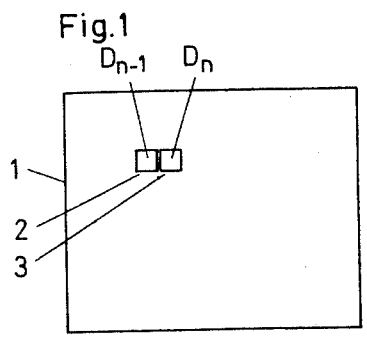
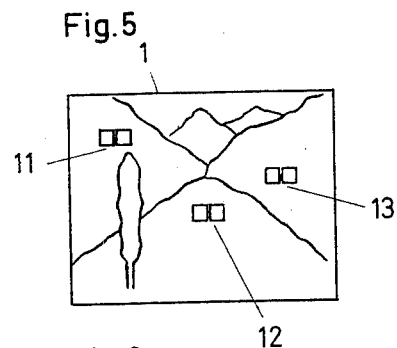
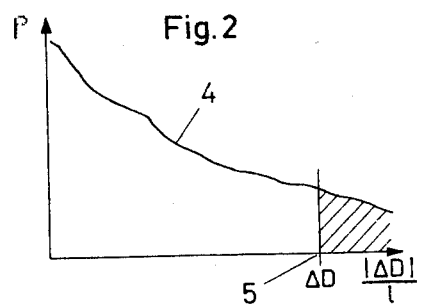
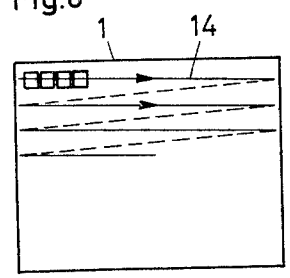
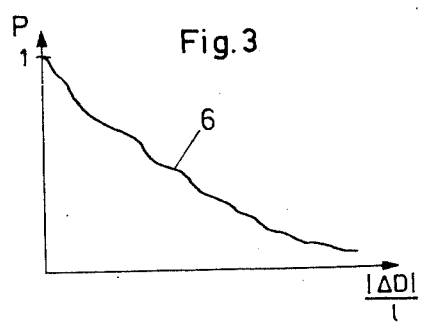
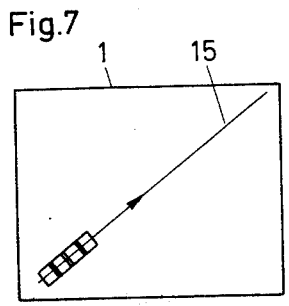
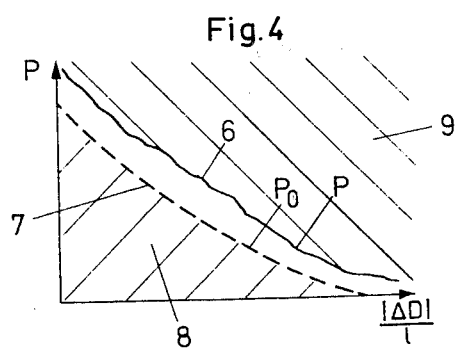
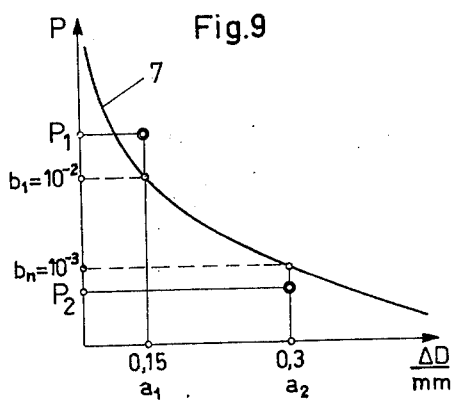

Graf et al.

[11] 4,123,778
[45] Oct. 31, 1978

[54] METHOD OF AND APPARATUS FOR DETERMINING THE SHARPNESS OF A PICTURE

[75] Inventors: Jean-Pierre Graf, Zürich; Tino Celio, Ambri, both of Switzerland

[73] Assignee: Gesellschaft zur Förderung der Forschung an der Eidgenössischen Technischen Hochschule, Zürich, Switzerland

[21] Appl. No.: 748,300

[22] Filed: Dec. 7, 1976

[30] Foreign Application Priority Data

Dec. 9, 1975 [CH] Switzerland .................. 15971/75

[51] Int. Cl.[2] .................. H04N 7/02; H04N 5/30
[52] U.S. Cl. .................. 358/107; 340/146.3 MA; 356/124; 358/130; 364/515
[58] Field of Search .................. 358/107, 93, 130, 166, 358/214; 354/25; 364/515; 340/146.3 MA; 356/124, 125

[56] References Cited

U.S. PATENT DOCUMENTS

| | | | |
|---|---|---|---|
| 3,805,239 | 4/1974 | Watanabe | 340/146.3 MA |
| 3,981,579 | 9/1976 | Weinert et al. | 355/18 |

*Primary Examiner*—Robert L. Richardson
*Attorney, Agent, or Firm*—William J. Daniel

[57] ABSTRACT

Method and apparatus for determining the sharpness of a picture through evaluation of the absolute values of the density differences between adjacent points of the image in at least one selected area of the image. The absolute values are measured and compared with at least two threshold values. The absolute difference values obtained as a result of the comparison are then counted when they exceed the threshold values. The counts thus obtained are compared with reference count values to produce a decision output and when a plurality of decision outputs are obtained, these are combined to arrive at a decision as to the sharpness of the image.

8 Claims, 10 Drawing Figures

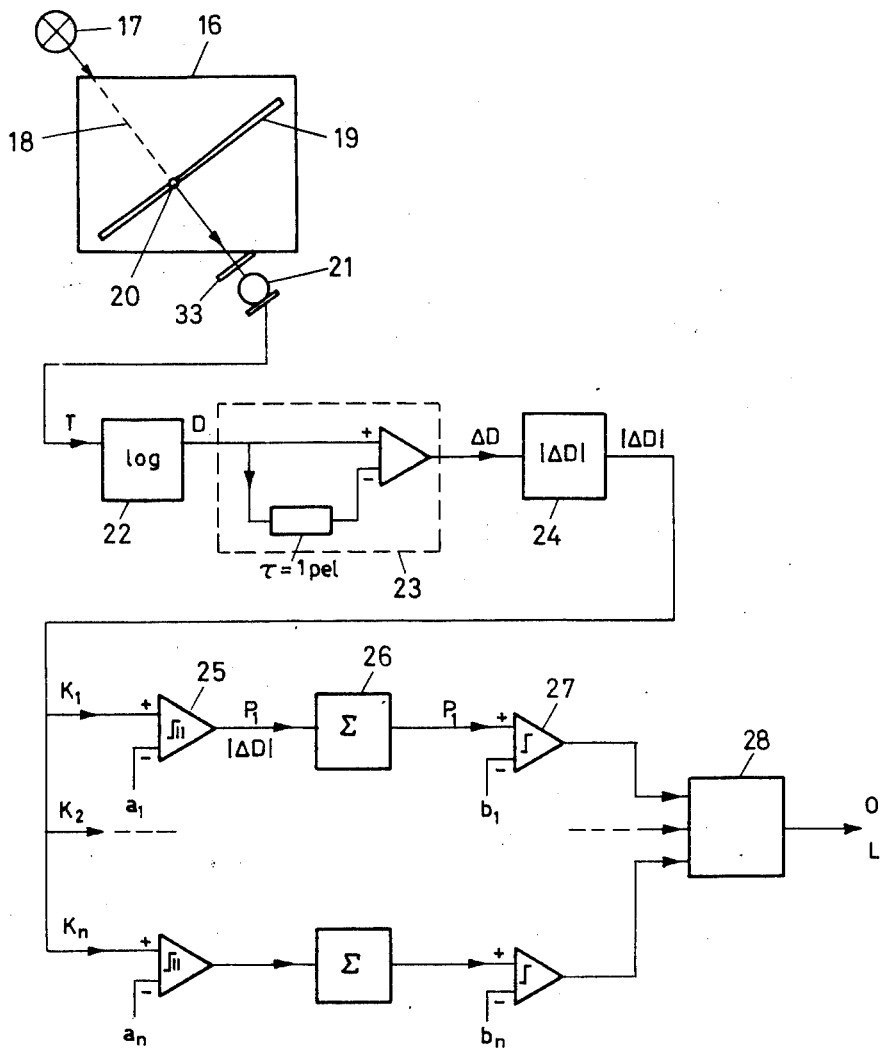

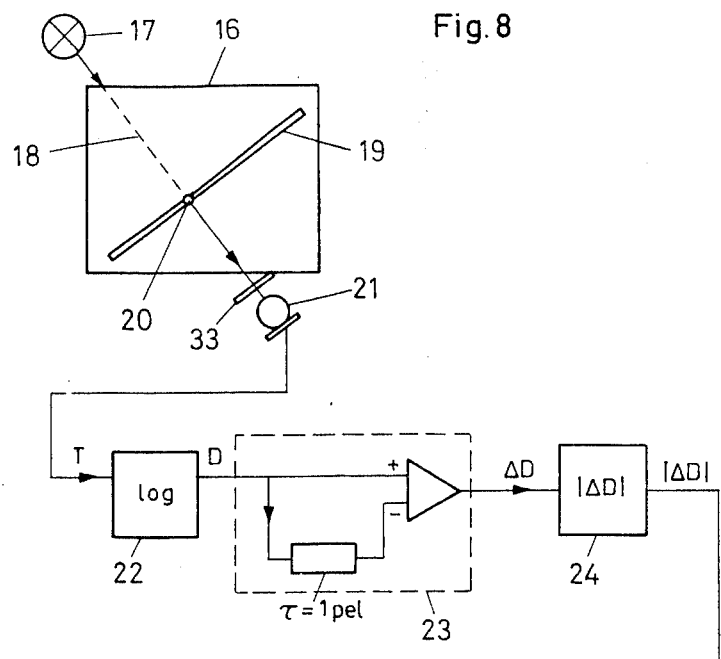
Fig. 8
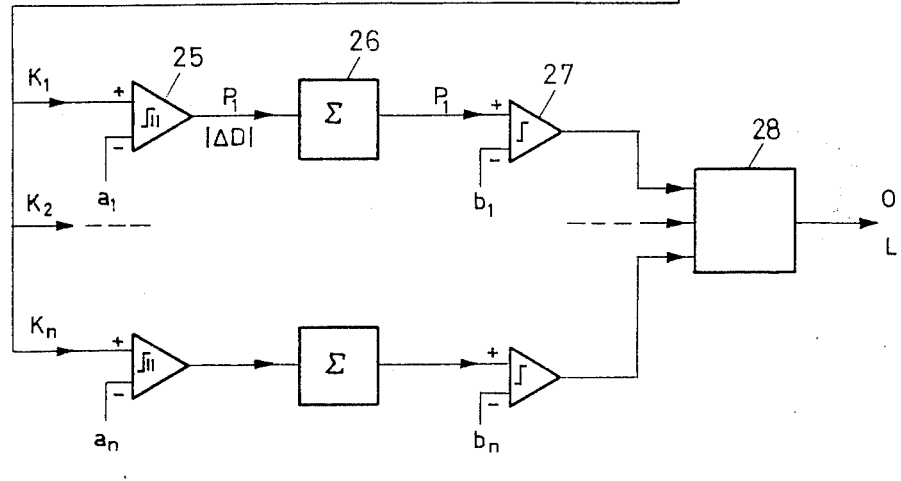
Fig. 10
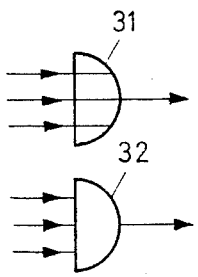

METHOD OF AND APPARATUS FOR DETERMINING THE SHARPNESS OF A PICTURE

The invention relates to a method of determining the sharpness of a picture and to an apparatus for carrying out this method.

Various arrangements for determining picture sharpness are already known. The oldest of these, the Focatron ("The Focatron", Craig, TAGA Proceedings 1962, p.p 205-211). is intended for use in photographic enlargers. It employs a standard picture, e.g. a bar picture, which is depicted in direct and diffused fashion, respectively on two non-linear photo detectors located in the image plane. By reason of the non-linearity, the mean value of the current of the diffused picture is greater than that of the directly depicted image. The difference is at its greatest when the picture is sharply focused. Other focusing devices based on the same principle but different in construction, are described in the relevant literature ("Die Scharfeinstellung von optischen, insbesondere photographischen Geraten"/The Sharp Focusing of Optical, particularly Photographic Equipment, Atorf, Photo-Technik-Wirtschaft 11/1968, pp. 482-485). Another arrangement intended for the focusing of television cameras ("Automatische Fokussierung von Fernsehkameras"/Automatic Focusing of Television Cameras, Kurz/Spiess, Inst.fur Technische Physik ETH Zurich, Semersterarbeit 7318, 1973), is based on the presence of a maximum signal level in a video signal which has undergone high-pass filtering.

Another known arrangement ("Automatic Focusing of a Computer-Controlled Microscope", Mason/Green, IEEE Trans.Biom.Engineering, July 1975, pp. 312–317) is based on the assumption that in a sharp picture, the sum of the image point densities is at the maximum. Accordingly, an algorithm is used to find the sharpest lens setting. Another type of method "Ueber eine objektive Methode zur Kennzeichnung der Bildscharfe"/On an Objective Method of Identifying Image Sharpness, Nguyen-An-Vinh, Bild und Ton 8/1970, pp. 229–236) are those which seek to derive from contrast transmission function a criterion of sharpness, whereby for example the presence of a determined contrast is assumed to be a measure of sharpness at one or more image frequencies.

Apart from the last-mentioned class of methods, the arrangements known and mentioned have in common the disadvantage that they work on the regulation principle. In order to ascertain the sharpness point, exactly as when determining sharpness manually, they must be regulated beyond the sharpness point and then regulated back. Therefore, they are only capable of functioning if a variation in sharpness can be brought about by the adjustment of an element, e.g. the lens. In the case of already recorded images, e.g. photographic pictures, these methods therefore positively fail. In the case of the last-mentioned class of methods, there is the disadvantage that these methods are based on a Fourier transformation of the image and that this operation is very involved.

The object of the invention is to provide a method and an apparatus with which the degree of sharpness of an image can be directly and easily ascertained.

The invention is explained in greater detail hereinafter with reference to examples of embodiment shown in the attached drawings, in which:

FIG. 1 shows two neighbouring image points;

FIG. 2 shows the frequency distribution of jumps in density in adjacent pairs of image points;

FIG. 3 shows an integral distribution corresponding to the density distribution in FIG. 2;

FIG. 4 shows a comparison between the integral distribution ascertained and predetermined;

FIGS. 5 to 7 show three different possibilities of selection of adjacent pairs of image points;

FIG. 8 shows an example of embodiment of an apparatus for carrying out the present method;

FIG. 9 shows the numerical example of a degree of sharpness, and

FIG. 10 shows two possible circuits for determining the degree of sharpness from different channel comparison.

As shown in FIG. 1, two adjacent image points 2 and 3 having respective densities $D_n-1$ and $D_n$ are chosen from the image 1. From this, an absolute density difference value $$|\Delta D| = D_n - D_{n-1} \qquad (1)$$

is formed. If this operation is carried out for a considerable number of pairs of image points, then it is possible to plot from the results a frequency distribution or, in the standard case, a probable density distribution $p$ (FIG. 2). To render this schedule independent of the degree of enlargement of the image 1, it is advisable to standardise the absolute density differences $\Delta D$ in respect of the image length l, i.e. to show them as a function of $|\Delta D|/l$. Furthermore, only the absolute density differences should be taken into account. Accordingly, the distribution indicated in FIG. 2 is typical for average pictures. Naturally, pictures with many details have a higher probability density at the greater density jumps. Sharp pictures likewise have a higher probability density at the greater density jumps. The probability density distribution P can therefore not be used to determine the degree of sharpness. On the other hand, if $$P(x) = \int_a^x p(x)dx \text{ wherein } x = \left|\frac{\Delta D}{l}\right| \qquad 2)$$

then there is a probability distribution P (FIG. 3) which is largely independent of the picture subject and which is a measure for the sharpness of the picture itself. If curve 6 is compared with a desired curve 7 (FIG. 4), then it is possible to judge whether the picture is sharp or not. If, in fact, curve 6 is above curve 7, then the picture can be regarded as sharp. If it is below, in the region 8, then the picture must be rejected as being not sharp. The establishment of curve 7 follows from experience and from a mean value of different subjects. In other words, therefore, by means of the method according to the invention in order for a picture to be sharp, a fixed portion of the area must be covered with details which have a predetermined difference in density in respect of the adjacent image points.

As a result of the present invention, it is possible absolutely (therefore without any reference to possibly less sharp pictures), to determine the degree of sharpness of a picture. The invention corresponds therefore to a long-held wish on the part of the picture processing industry, particularly in connection with photo finishing, where, without any knowledge of the original subjects, sharp and non-sharp photographic pictures are encountered.

According to a further development of the invention, not all picture spots are used for determining sharpness, a factor which reduces the cost of equipment. The pairs of image points can (FIG. 5) be taken from those parts of the picture which are important (e.g. pairs 11, 12, 13 or image points). If the pairs of image points to be compared are taken randomly through the picture, then it takes 2 N number of image points to give N number of differences in density. If the image points are chosen from along a continuous line (FIG. 6), then in order to form N number of differences in density, it takes only N+1 image points. In principle, the form of the line can be as desired and in particular it may constitute the main diagonal of the picture (FIG. 7). This arrangement has the advantage that despite the reduced number of image points, the most important points of the picture are all in probability included, and also that determination of sharpness is independent of the horizontal or vertical location of the picture. In the past, nothing was ever said about the spectral composition of the picture data. It is evident that one can if necessary determine the degree of sharpness in the spectral range where the picture appears to be sharpest. This can happen in known manner, e.g. by the attachment of colour filters.

An apparatus constructed by the method according to the invention is shown in FIG. 8. In keeping with the arrangement shown in FIG. 7, only the image points on the diagonal 19 are illuminated by spotwise scanning, consisting of a light source 17, colour filter 33 and photoconductor 21. The transmission signal T obtained is converted into a density signal D in the logarithmic calculator 2. Subsequently, the density difference $\Delta D$ between that of signal and the density signal of the preceding image point is calculated in the differentiator 23 in accordance with the formula (1) and the absolute value of the density difference, which value is represented by the symbol $|\Delta D|$, is determined in the network 24. Now, in line with the idea underlying the invention, the frequency distribution of the $|\Delta D|$ values and its integral distribution must be calculated. In this preferred embodiment, the $|\Delta D|$ values are each compared with $n$ number of desired threshold values $a_1 \ldots a_n$, where $n$ is an integer greater than 1, i.e. 2 or more. In terms of the circuit required, this requires $n$ number of computation channels $k_1 \ldots k_n$ in which in each case by means of threshold value detector 25, the number of $|\Delta D|$ values which are greater than a predetermined threshold value $a_n$ is determined. These differences are then added together in adding mechanism 26 to give a number $N_1 \ldots N_n$ which corresponds to the integral of all the $|\Delta D|$ values determined. Then, the threshold value detector 27 checks whether the value of each number $N_1 \ldots N_n$ is above or below a determined corresponding threshold value $b_1 \ldots b_n$. The corresponding logic answer is passed on to evaluator 28. From the logical answer given by the various channels $k_1 \ldots k_n$, the evaluator 28 calculates in a manner which is still to be explained whether the image is sharp or not. For this purpose, reference is made to FIG. 9. For example, in channel 1, if the value $N_1$ proves to be greater than $b_1$, then accordingly the picture will surely be regarded as sharp even if all the other values $p_n$ are above the corresponding $b_2 \ldots b_n$ values. Similarly, if all $N_2 \ldots N_n$ values are below the corresponding $b_n$ values, then the picture would have to be regarded as clearly lacking in sharpness. However, if some of the $N_n$ values are above and others below the curve 7, then an answer is only possible by using evaluator 28. This can be achieved in various ways. The simplest is (FIG. 10) and may take the form of an OR (31) or AND (32) circuit. Correspondingly, only one number $N_n$ or alternatively all such numbers would have to be above curve 7 for the picture to be considered sharp. It goes without saying that other majority decisions are possible, for example if it was required that a minimum number of $N_n$ values be above the curve 7. Numerical data on the preferred embodiment in FIG. 8 are:

-Number of image points on diagonal 19: 1000 points
-Number of channels: $k = 2$
-Threshold values of channels:
  $a_1 = 0.15(|\Delta D|$ per mm), $b_1 = 10^{-2}$
  $a_2 = 0.30(|\Delta D|$ per mm), $b_2 = 10^{-3}$
-Channel circuit: OR (i.e. network 31)

In conclusion, it must be pointed out once again that where the present method is concerned, evaluation of the radiation emanating due to transmission reflection, from one image point, can be effected through any desired spectral filters. With this in mind, therefore, the term "image point brightness" used here is not restricted to an evaluation according to the spectral brightness sensitivity characteristic of the eye established by international standards but embraces all general evaluations using any desired characteristics of the spectral density of radiation.

In the case of translucent images, transmitted light is ideally used while in the case of opaque images, reflected light is used while for television pictures, an electrical value dependent upon the brightness of the picture elements of the television picture is inherently contained in the video signal which amounts to a train of individual point signals in series.

What we claim is:

1. A method of determining the sharpness of a picture through the detection and evaluation of the absolute values of the density differences between adjoining points of the picture of at least one selected area of the picture, comprising the steps of:
   (a) determining the absolute values $|\Delta D|$ of the density-differences of a plurality of adjacent image elements within at least one area of a picture;
   (b) for these absolute values, selecting at least two different threshold values $a_1 \ldots a_n$;
   (c) comparing the absolute difference values $|\Delta D|$ with each of the threshold values $a_1 \ldots a_n$ and separately counting those absolute difference values which exceed each of these threshold values to obtain a corresponding number of counts $N_1 \ldots N_n$;
   (d) comparing each of the obtained counts $N_1 \ldots N_n$ with a corresponding reference value $b_1 \ldots b_n$ to produce a decision output for each comparison; and
   (e) combining the decision outputs of the comparisons to obtain a decision as to the sharpness of the image.

2. A method according to claim 1, characterized in that the selected area is determined in isolated point pairs in each case and in that only the density jumps within the individual point pairs are considered.

3. A method according to claim 1, characterized in that the center of the picture is chosen as the selected area.

4. A method according to claim 1, characterized in that the picture points are selected in such a manner that they form a connected line.

5. A method according to claim 1, characterized in that a picture diagonal is chosen as the selected area.

6. An apparatus for processing electric signals representing picture information, characterized in:
   (a) a subtraction circuit (23) for the measuring of the differences ($\Delta D$) between the density signals (D) originating from a plurality of picture point pairs;
   (b) an absolute value circuit (24) for calculating the absolute values ($|\Delta D|$) of the differences ($\Delta D$);
   (c) at least two first threshold value circuits (25) to determine whether each of the absolute values from circuit (24) ($|\Delta D|$) exceed a variety of threshold values ($a_1 \ldots a_n$);
   (d) at least two counter circuits (26) connected with the first threshold value circuits (25) for determining the numbers ($N_1 \ldots N_n$) of those absolute difference values which do exhibit a difference ($|\Delta D|$) greater than the given threshold values ($a_1 \ldots a_n$);
   (e) at least two second threshold value circuits (27) to determine whether the numbers ($N_1 \ldots N_n$) exceed the predetermined reference values ($b_1 \ldots b_n$) present in the latter threshold value circuits; and
   (f) a comparison circuit (28) for the linkage of the signals originating from said second threshold value circuits.

7. An apparatus according to claim 6, characterized in that the comparison circuit (28) is set up for a logical AND or OR linkage.

8. An apparatus according to claim 6, characterized in that an electro-optical means (17, 21, 22) for pointwise scanning of the picture and for ascertaining the relative density of the scanned points and providing a corresponding output signal is connected before the subtraction circuit (23).

* * * * *